United States Patent
Delgado et al.

(10) Patent No.: US 10,315,661 B2
(45) Date of Patent: Jun. 11, 2019

(54) SPEED-BASED WINDOW CONTROL

(71) Applicant: Ford Global Technologies, LLC, Dearborn, MI (US)

(72) Inventors: David Delgado, Alvaro Obregon (MX); Kevin Amper, Huixquilucan (MX); Juan Esteban Rivera, Puebla (MX); Victor Christian Jaime, Mexico city (MX); Brian Jashel Covarrubias, Los Heroes Coacalco (MX)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 15/251,633

(22) Filed: Aug. 30, 2016

(65) Prior Publication Data
US 2018/0057012 A1  Mar. 1, 2018

(51) Int. Cl.
| | | |
|---|---|---|
| *B60W 50/00* | (2006.01) | |
| *B60H 1/00* | (2006.01) | |
| *B60H 1/24* | (2006.01) | |
| *B60H 1/26* | (2006.01) | |
| *E05F 15/695* | (2015.01) | |
| *E05F 15/697* | (2015.01) | |
| *E05F 15/70* | (2015.01) | |

(52) U.S. Cl.
CPC ......... *B60W 50/0098* (2013.01); *B60H 1/008* (2013.01); *B60H 1/00764* (2013.01); *B60H 1/24* (2013.01); *B60H 1/267* (2013.01); *E05F 15/695* (2015.01); *E05F 15/697* (2015.01); *E05F 15/70* (2015.01); *B60W 2520/10* (2013.01); *E05Y 2400/32* (2013.01); *E05Y 2400/44* (2013.01); *E05Y 2400/45* (2013.01); *E05Y 2900/50* (2013.01); *E05Y 2900/55* (2013.01)

(58) Field of Classification Search
CPC .......... B60W 50/0098; B60W 2520/10; E05F 15/695; E05F 15/697; E05F 15/70; B60H 1/00764; B60H 1/008; B60H 1/24; E05Y 2400/32; E05Y 2400/44; E05Y 2400/45
USPC .......................................................... 701/48
See application file for complete search history.

(56) References Cited

U.S. PATENT DOCUMENTS

| | | | |
|---|---|---|---|
| 3,611,099 | A | 10/1971 | Kuroyama |
| 4,408,713 | A | 10/1983 | Iijima et al. |
| 4,562,387 | A | 12/1985 | Lehnhoff |

(Continued)

FOREIGN PATENT DOCUMENTS

| | | |
|---|---|---|
| CN | 201816541 U | 5/2011 |
| JP | 2003312253 A | 11/2003 |

(Continued)

OTHER PUBLICATIONS

Search Report dated Feb. 19, 2018 for GB Patent Application No. 1713516.1 (3 pages).

*Primary Examiner* — Rodney A Butler
(74) *Attorney, Agent, or Firm* — Frank Lollo; Neal, Gerber & Eisenberg LLP; James P. Muraff

(57) ABSTRACT

Apparatus and methods are disclosed for speed-based window control. An example disclosed vehicle includes a speed sensor and a body control module. When a side window is open, the body control module monitors, via the speed sensor, a speed of the vehicle. In response to the speed of the vehicle satisfying a first speed threshold, the body control module closes the side window and then, after the side window is closed, activates an air conditioner.

15 Claims, 4 Drawing Sheets

(56) References Cited

U.S. PATENT DOCUMENTS

| | | | |
|---|---|---|---|
| 5,054,686 | A | 10/1991 | Chuang |
| 5,248,897 | A | 9/1993 | Lee |
| 5,422,551 | A | 6/1995 | Takeda et al. |
| 5,982,124 | A | 11/1999 | Wang |
| 6,345,767 | B1 | 2/2002 | Burrus, IV et al. |
| 6,693,535 | B2 | 2/2004 | Van Bosch |
| 6,748,308 | B2 | 6/2004 | Losey |
| 8,831,840 | B2 | 9/2014 | Klappert |
| 9,213,338 | B1 | 12/2015 | Ferguson |
| 9,409,549 | B2 | 8/2016 | Yopp |
| 2001/0039806 | A1* | 11/2001 | Kawai ............... B60H 1/00792 62/229 |
| 2002/0143452 | A1 | 10/2002 | Losey |
| 2004/0262940 | A1 | 12/2004 | Johnson |
| 2007/0193811 | A1* | 8/2007 | Breed ............... B60R 21/01536 180/271 |
| 2009/0031741 | A1* | 2/2009 | Hara ................. B60H 1/00735 62/239 |
| 2015/0226146 | A1 | 8/2015 | Elwart et al. |
| 2016/0090773 | A1 | 3/2016 | Wippler |
| 2016/0362089 | A1* | 12/2016 | Lapeer ..................... B60S 3/04 |
| 2017/0158023 | A1* | 6/2017 | Stevanovic ........ B60H 1/00771 |

FOREIGN PATENT DOCUMENTS

| | | |
|---|---|---|
| JP | 2007153076 A | 6/2007 |
| JP | 4779748 B2 | 9/2011 |
| KR | 20040065876 A | 7/2004 |
| WO | WO 2010022482 A1 | 3/2010 |
| WO | WO 2011/014938 A1 | 2/2011 |
| WO | WO 2012/106787 A1 | 8/2012 |

\* cited by examiner

SPEED-BASED WINDOW CONTROL

TECHNICAL FIELD

The present disclosure generally relates to body control modules in vehicles and, more specifically, speed-based window control.

BACKGROUND

On hot days, occupants in a vehicle usually either roll down window or use the air conditioner. Open windows create drag on a moving vehicle, which affects fuel efficiency. Additionally, cooling the air through a compressor of the air conditioner also decreases fuel efficiency. Typically, the occupants do not know which option is best to cool down while also minimizing the impact on fuel efficiency of the vehicle.

SUMMARY

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

Example embodiments are disclosed for speed-based window control. An example disclosed vehicle includes a speed sensor and a body control module. When a side window is open, the body control module monitors, via the speed sensor, a speed of the vehicle. In response to the speed of the vehicle satisfying a first speed threshold, the body control module closes the side window and then, after the side window is closed, activates an air conditioner.

An example disclosed method includes monitoring, with a speed sensor, a speed of the vehicle when one of a plurality of side windows is open. The example method also includes, in response to the speed of the vehicle satisfying a first speed threshold, closing, with window controllers, the plurality of the side windows, and after the plurality of the side windows are closed, activating an air conditioner of an HVAC system.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

Figure 1:
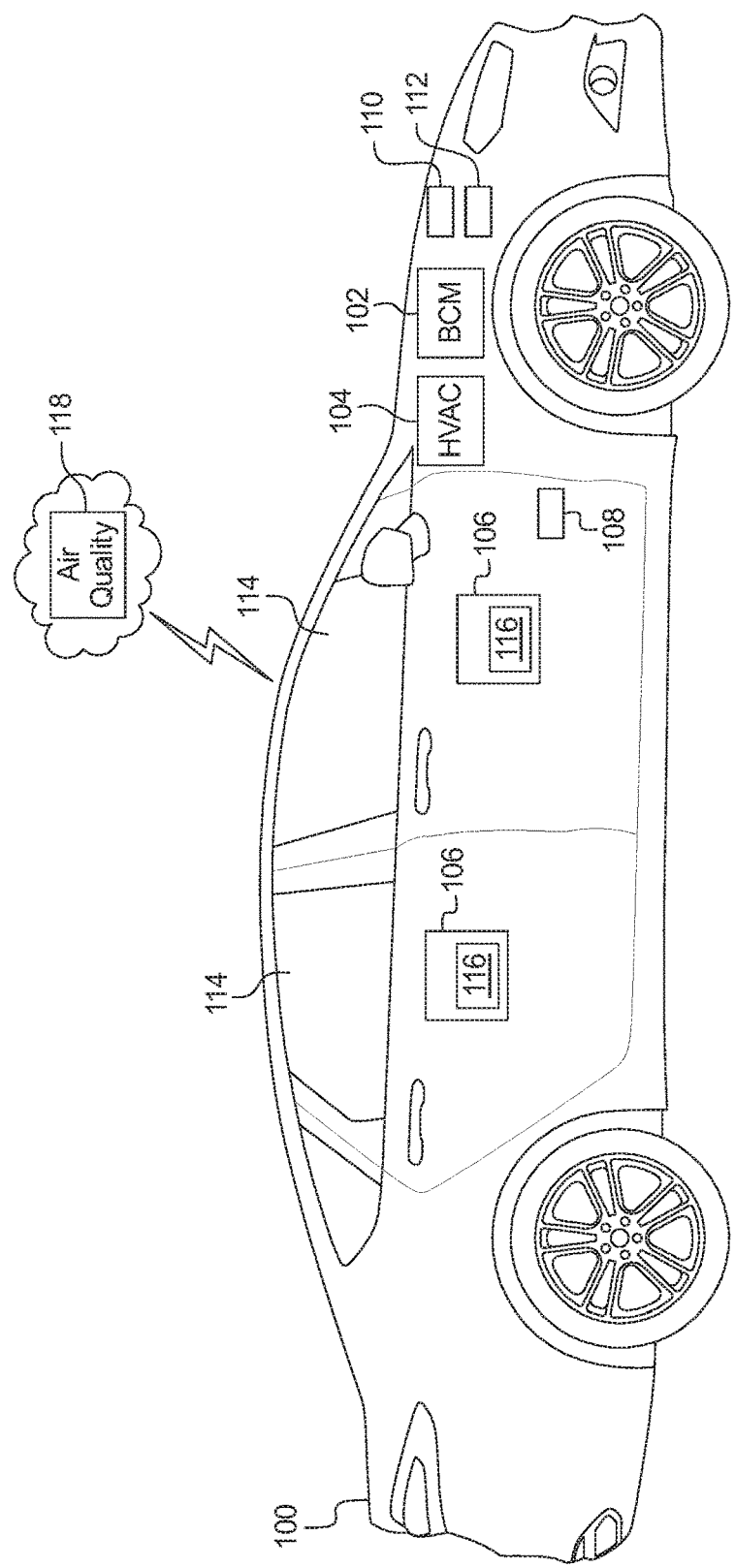
FIG. 1 illustrated a vehicle with a body control module operating in accordance with the teachings of this disclosure.

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

Operating the air conditioner decreases the fuel efficiency of a vehicle. For example, cooling the air through a compressor may decrease the fuel efficiency by ten percent. Driving with the side windows open decreases the fuel efficiency of the vehicle. The decrease in fuel efficiency is based on the speed of the vehicle. For example, driving with the side windows open at a speed of fifty miles per hour (mph) may decrease the fuel efficiency by up to twenty percent. Additionally, at higher speeds the wind causes an uncomfortable noise inside the cabin of the vehicle. This uncomfortable noise can be ameliorated by closing the side windows. However, at highway speeds, the time it takes to close the windows and turn on the air conditioner may distract the driver.

As disclosed below, when the speed of the vehicle satisfies (e.g., is greater than or equal to) a first speed threshold and one or more side windows are open, the vehicle stores, in memory, the position of the window(s) and attempts to automatically close the windows. For example, the first speed threshold may be 50 mph. If closing the windows is successful (e.g., no obstructions prevent closing), the vehicle automatically activates the air conditioner of the heating, ventilating/ventilation, and air conditioning (HVAC) system. The settings of the air conditioner may be based on, for example, (a) preset temperature and blower settings configured by the occupants, (b) recent temperature and blower settings, and/or (c) temperature and blower value settings based on ambient and cabin temperatures. When the speed of the vehicle satisfies (e.g., is less than) a second speed threshold for a period of time, the vehicle deactivates the air conditioning and automatically opens windows. For example, the second threshold may be 30 mph and the period of time may be 30 seconds. In some examples, the vehicle opens the windows to the position stored in memory. In such a manner, the fuel economy of the vehicle is improved. Additionally, distractions to the driver are reduced.

FIG. 1 illustrated a vehicle 100 with a body control module 102 operating in accordance with the teachings of this disclosure. The vehicle 100 may be a standard gasoline powered vehicle, a hybrid vehicle, an electric vehicle, a fuel cell vehicle, and/or any other mobility implement type of vehicle. The vehicle 100 includes parts related to mobility, such as a powertrain with an engine, a transmission, a suspension, a driveshaft, and/or wheels, etc. The vehicle 100 may be non-autonomous, semi-autonomous (e.g., some routine motive functions controlled by the vehicle 100), or autonomous (e.g., motive functions are controlled by the vehicle 100 without direct driver input). In the illustrated example the vehicle 100 includes an HVAC system 104, window controllers 106, a speed sensor 108, an ambient temperature sensor 110, a cabin temperature sensor 112, and the body control module 102.

The HVAC system 104 provides heating and cooling to the interior of the vehicle 100. The HVAC system 104 includes digital and/or analog interfaces (e.g., input devices and output devices) to receive input from user(s) (e.g., occupants of the vehicle 100) and display information. The input devices may include, for example, a control knob, an instrument panel, a digital camera for image capture and/or visual command recognition, a touch screen, an audio input device (e.g., cabin microphone), buttons, or a touchpad. The output devices may include instrument cluster outputs (e.g., dials, lighting devices), information on a heads-up display, and/or information on a center console display (e.g., a liquid crystal display ("LCD"), an organic light emitting diode ("OLED") display, a flat panel display, a solid state display, etc.). Through the input devices, the user(s) selects a temperature setting, a blower speed setting, a vent configuration, a source setting (e.g., internal air, external air, etc.). For example, the input devices may facilitate the user(s) selecting a target internal temperature.

The window controllers 106 open and close the side windows 114 of the vehicle 100. Each of the window controllers 106 includes an electric lift motor and one or more gears to raise and lower the corresponding side window 114. The window controllers 106 are communicatively coupled to the body control module 102. In some examples, the analog switches on the interior of the door are monitored for the body control module 102 to provide control signals to the window controllers 106. In some examples, the window controllers 106 have position settings that indicate how much the window is open. For example, the window controllers may have five position settings between fully open and fully closed. In the illustrated example, the window controllers 106 include an obstruction sensor 116. The obstruction sensor 116 senses when an object (e.g., an arm, an elbow, etc.) is blocking the path of the side window 114 to be raised. In some examples, the obstruction sensor 116 monitors the current supplied to the electric lift motor. Obstructions cause the electric lift motor to draw more current. In such examples, the obstruction sensor 116 detects an obstruction when the current supplied to the electric lift motor increases beyond a threshold value. The window controller 106 stops attempting to raise the side window 114 when the obstruction sensor 116 detects an obstruction. Additionally, the corresponding window controller 106 signals the body control module 102 that it detected an obstruction.

The speed sensor 108 measures the speed of the vehicle 100. In some examples, the speed sensor 108 is a wheel speed sensor that measures the rotation of one of the wheels of the vehicle 100. Alternatively, the speed sensor 108 measures the rotation of a crankshaft of the vehicle 100. The ambient temperature sensor 110 measures the exterior temperature proximate the vehicle 100. The ambient temperature sensor 110 may be any suitable temperature sensor. In some examples, the ambient temperature sensor 110 is located in a front bumper of the vehicle 100. The cabin temperature sensor(s) 112 measures the temperature inside the passenger cabin of the vehicle 100. The cabin temperature sensor(s) 112 may be any suitable temperature sensor (e.g., a thermistor, an infrared sensor, etc.).

The body control module 102 controls various subsystems of the vehicle 100. For example, the body control module 102 may control power windows, power locks, an immobilizer system, and/or power mirrors, etc. The body control module 102 includes circuits to, for example, drive relays (e.g., to control wiper fluid, etc.), drive brushed direct current (DC) motors (e.g., to control power seats, power locks, wipers, etc.), drive stepper motors, and/or drive LEDs, etc. The body control module 102 is communicatively coupled to the input controls within the vehicle 100, such as power window control buttons, power lock buttons, etc. The body control module 102 instructs the corresponding subsystem to act based on the actuated input control. For example, if the driver's side window button is toggled to lower the driver's side window, the body control module 102 instructs the corresponding window controller 106 to lower the side window 114.

The body control module 102 monitors the speed of the vehicle 100 (e.g., via the speed sensor 108), the position of the side windows 114 (e.g., via the window controllers 106), and the state (e.g. on or off) of an air conditioner of the HVAC system 104. When the speed of the vehicle 100 satisfies (e.g., is greater than or equal to) a first speed threshold and the air conditioner of the HVAC system 104 is on, the body control module 102 instructs the window controllers 106 to close the side windows 114 that are currently open. The body control module 102 determines which of the side windows 114 are open based on position settings provided by the window controllers 106. For example, the window controllers 106 may indicate that the side windows 114 are open, partially open, or closed. As another example, the window controllers 106 may indicate the degree to which the side windows 114 are partially open, such as 50% open, 25% open, etc. In some examples, the first speed threshold is 50 mph. In some examples, the body control module 102 stores, in memory (e.g., the memory 210 of FIG. 2 below), position data indicative of the positions of the side windows 114. In response to one or more of the window controllers 106 detecting an obstruction, the body control module 102 waits a moment (e.g., one second, two seconds, etc.) and attempts to close the side window(s) 114 again. The body control module 102 makes a number of attempts to close the side windows 114. For example, the body control module 102 may attempt to close the side windows 114 three times. If, after the number of attempts, the side windows 114 are not successfully closed, the body control module 102 discontinues attempting to close the side window 114. In some examples, after discontinuing, the body control module 102 provides an audio or visual notification to the user(s) (e.g., via a dashboard display, etc.) Additionally, in some examples, after discontinuing, the body control module 102 waits a period of time (e.g., five minutes, ten minutes, etc.) before monitoring the speed of the vehicle 100 again. In some examples, the body control module 102 cancels closing the side windows 114 in response to the power window control button being activated while the side windows 114 are closing. In some such examples, the body control module 102 instructs the window controllers 106 to return the side windows 114 to the previous positions (e.g., as store in memory). Additionally, in some such examples, the body control module 102 waits until a trigger event before monitoring the speed of the vehicle 100 again. For example, the body control module 102 may wait until the ignition switch is cycled and/or the transmission is shifted out of park.

If shutting the side windows 114 is successful, the body control module 102 instructs the HVAC system 104 to activate the air conditioner. In some examples, the body control module 102 provides temperature settings and/or blower settings to the HVAC system 104. The temperature settings and/or blower settings are (a) preset temperature and blower setting configured by the occupants, (b) recent temperature and blower settings (e.g., the temperature and blower settings from the last time the air conditioner of the HVAC system 104 was active, etc), and/or (c) temperature and blower settings based on ambient and cabin temperatures. The users may set temperature and/or blower setting preferences via an infotainment system. Additionally or alternatively, in some examples, the body control module 102 stores in memory the temperature and blower settings when, as discussed below, the body control module 102 deactivates the air conditioner of the HVAC system 104. Additionally or alternatively, in some examples, the body control module 102 sets the temperature and blower settings based on the cabin temperature measured by the cabin temperature sensor 112 and/or the ambient temperature measured by the ambient temperature sensor 110. For example, the body control module 102 may set the temperature and blower settings so the cabin temperature remains substantially constant (e.g., within a few degrees, etc.) before and after the side windows 114 are closed.

When the speed of the vehicle 100 satisfies (e.g., is greater than or equal to) a second speed threshold for a period of time, the body control module 102 instructs the HVAC system 104 to deactivate the air conditioning. In some example, the second speed threshold is 30 mph. In some examples, the period of time is 30 seconds. In some examples, the body control module 102 stores, in memory, the temperature and blower settings of the HVAC system 104. The body control module 102 instructs the window controllers 106 to open one or more of the side windows 114. In some examples, the body control module 102 instructs the window controllers 106 to open the side windows 114 according to the position data stored in memory. In some examples, the body control module 102 cancels opening the side windows 114 in response to the power window control button being activated while the side windows 114 are opening. In such examples, the body control module 102 instructs the HVAC system 104 to activate the air conditioning based on the temperature and blower setting stored in memory.

In some examples, the body control module 102 does not instruct the window controllers 106 to open the side windows 114 based on air quality. In such examples, the body control module 102 commutatively couples to an air quality server 118 (e.g., via the on-board communications platform 206 of FIG. 2 below) operated by any suitable entity (e.g., a government agency, a vehicle manufacturer, a non-profit organization, etc.). For example, the air quality server 118 may be operated by the United States Environmental Protection Agency. In such examples, the body control module 102 receives an Air Quality Index (AQI) value from the air quality server 118 for a region corresponding to the location of the vehicle 100. The AQI includes measurements of ground-level ozone, particulate matter, carbon monoxide, sulfur dioxide, and nitrogen dioxide. In some examples, the body control module 102 does not instruct the window controllers 106 to open the side windows 114 when the AQI value satisfies (e.g., is greater than or equal to) a quality threshold. In some such examples, the quality threshold is 100 on a scale of 0 to 500.

Figure 2:
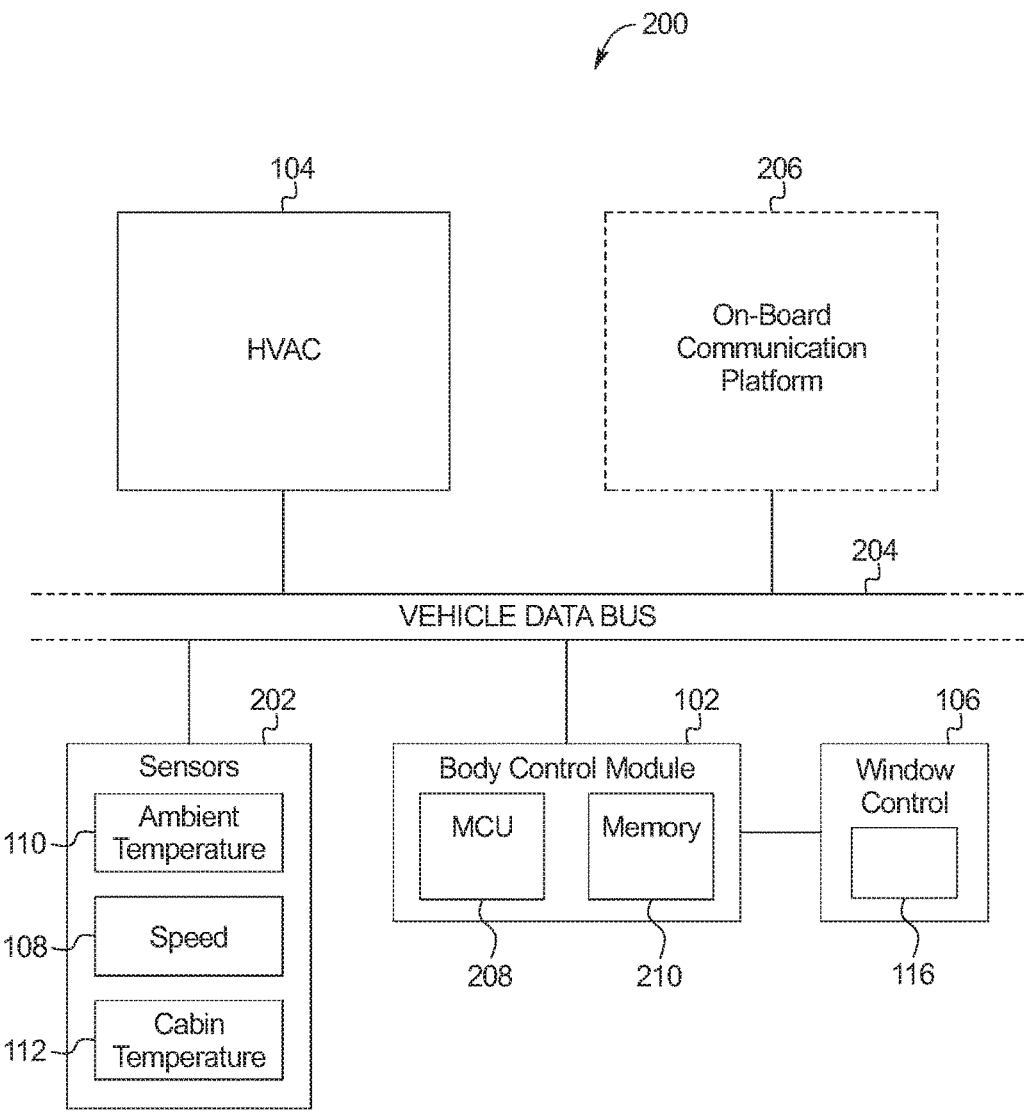
FIG. 2 is a block diagram of electronic components of the vehicle of FIG. 1.

FIG. 2 is a block diagram of electronic components 200 of the vehicle 100 of FIG. 1. In the illustrated example, the electronic components 200 include the body control module 102, the HVAC system 104, the window controllers 106, sensors 202, and a vehicle data bus 204. In some examples, the electronic components 200 include an on-board communications platform 206.

In the illustrated example, the body control module 102 includes a processor or controller 208, and memory 210. The processor or controller 208 may be any suitable processing device or set of processing devices such as, but not limited to: a microprocessor, a microcontroller-based platform, a suitable integrated circuit, one or more field programmable gate arrays (FPGAs), and/or one or more application-specific integrated circuits (ASICs). The memory 210 may be volatile memory (e.g., RAM, which can include non-volatile RAM, magnetic RAM, ferroelectric RAM, and any other suitable forms); non-volatile memory (e.g., disk memory, FLASH memory, EPROMs, EEPROMs, resistive non-volatile solid-state memory, etc.), unalterable memory (e.g., EPROMs), read-only memory, and/or high-capacity storage devices (e.g., hard drives, solid state drives, etc). In some examples, the memory 210 includes multiple kinds of memory, particularly volatile memory and non-volatile memory.

The memory 210 is computer readable media on which one or more sets of instructions, such as the software for operating the methods of the present disclosure can be embedded. The instructions may embody one or more of the methods or logic as described herein. In a particular embodiment, the instructions may reside completely, or at least partially, within any one or more of the memory 210, the computer readable medium, and/or within the processor 208 during execution of the instructions.

The terms "non-transitory computer-readable medium" and "computer-readable medium" should be understood to include a single medium or multiple media, such as a centralized or distributed database, and/or associated caches and servers that store one or more sets of instructions. The terms "non-transitory computer-readable medium" and "computer-readable medium" also include any tangible medium that is capable of storing, encoding or carrying a set of instructions for execution by a processor or that cause a system to perform any one or more of the methods or operations disclosed herein. As used herein, the term "computer readable medium" is expressly defined to include any type of computer readable storage device and/or storage disk and to exclude propagating signals.

The sensors 202 may be arranged in and around the vehicle 100 in any suitable fashion. The sensors 202 may include camera(s), sonar, RADAR, LiDAR, ultrasonic sensors, optical sensors, or infrared devices configured to measure properties around the exterior of the vehicle 100. Additionally, some sensors 202 may be mounted inside the passenger compartment of the vehicle 100 or in the body of the vehicle 100 (such as, the engine compartment, the wheel wells, etc.) to measure properties in the interior of the vehicle 100. For example, such sensors 202 may include accelerometers, odometers, tachometers, pitch and yaw sensors, cameras, microphones, and tire pressure sensors, biometric sensors, etc. In the illustrated example, the sensors 202 include the ambient temperature sensor 110 and the cabin temperature sensor 112.

The vehicle data bus 204 communicatively couples the body control module 102, the HVAC system 104, the sensors 202, and, in some examples, the on-board communications platform 206. In some examples, the vehicle data bus 204 includes one or more data buses. The vehicle data bus 204 may be implemented in accordance with a controller area network (CAN) bus protocol as defined by International Standards Organization (ISO) 11898-1, a Media Oriented Systems Transport (MOST) bus protocol, a CAN flexible data (CAN-FD) bus protocol (ISO 11898-7) and/a K-line bus protocol (ISO 9141 and ISO 14230-1), and/or an Ethernet™ bus protocol IEEE 802.3 (2002 onwards), etc.

The on-board communications platform 206 includes wired or wireless network interfaces to enable communication with external networks. The on-board communications platform 206 also includes hardware (e.g., processors, memory, storage, antenna, etc.) and software to control the wired or wireless network interfaces. In some examples, the on-board communications platform 206 includes controllers for Bluetooth® and/or other standards-based networks (e.g., Global System for Mobile Communications (GSM), Universal Mobile Telecommunications System (UMTS), Long Term Evolution (LTE), Code Division Multiple Access (CDMA), WiMAX (IEEE 802.16m); Near Field Communication (NFC); local area wireless network (including IEEE 802.11 a/b/g/n/ac or others), and Wireless Gigabit (IEEE 802.11ad), etc.). Additionally, in some examples, the on-board communications platform 206 also includes the GPS receiver. Further, the external network(s) may be a public network, such as the Internet; a private network, such as an intranet; or combinations thereof, and may utilize a variety of networking protocols now available or later developed including, but not limited to, TCP/IP-based networking protocols. For example, the external network(s) may include the air quality server 118.

Figure 3A:
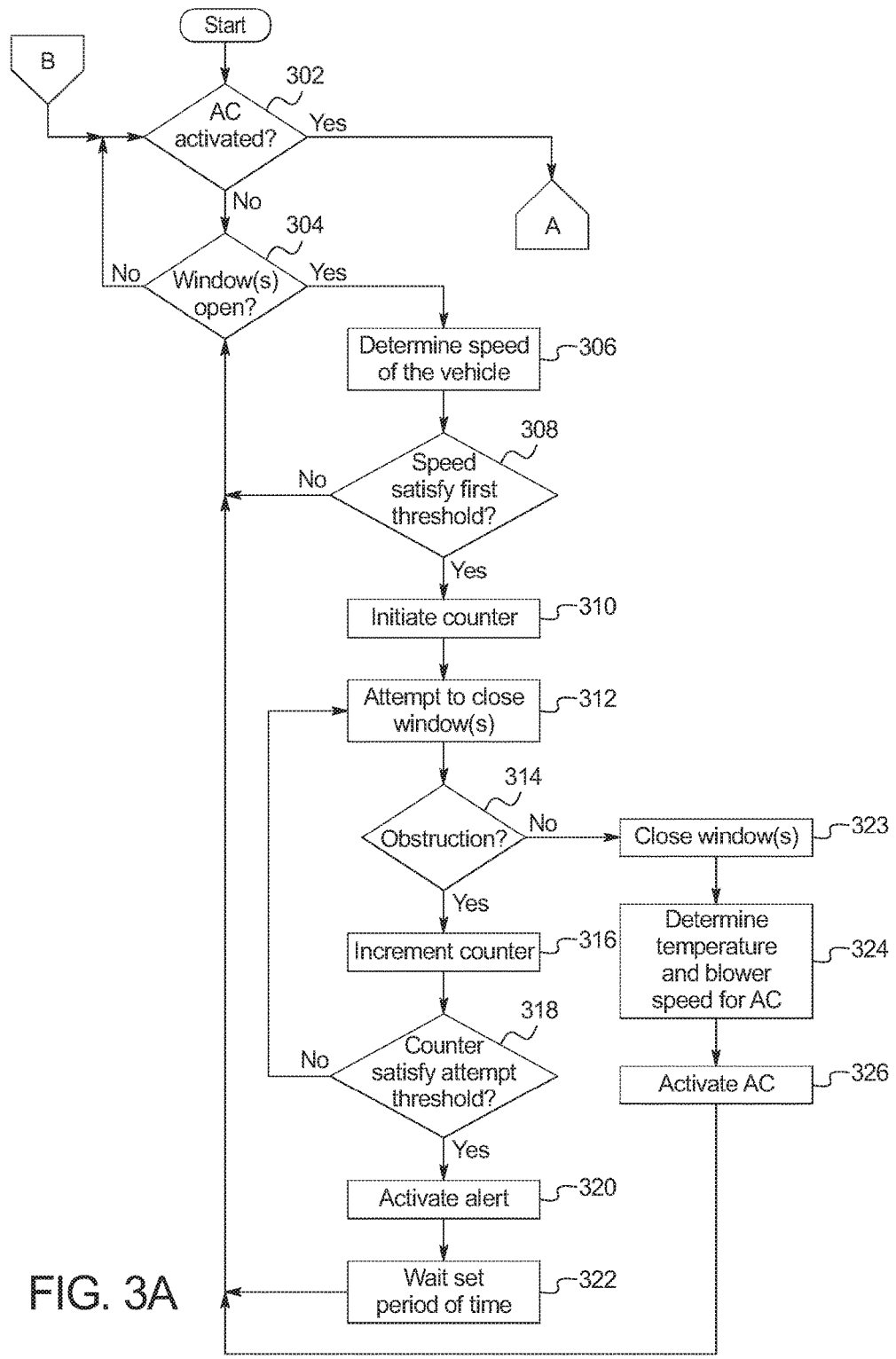
FIGS. 3A and 3B are flowcharts of a method to control windows based on the speed of the vehicle of FIG. 1 that may be implemented by the electronic components of FIG. 2.
Figure 3B:
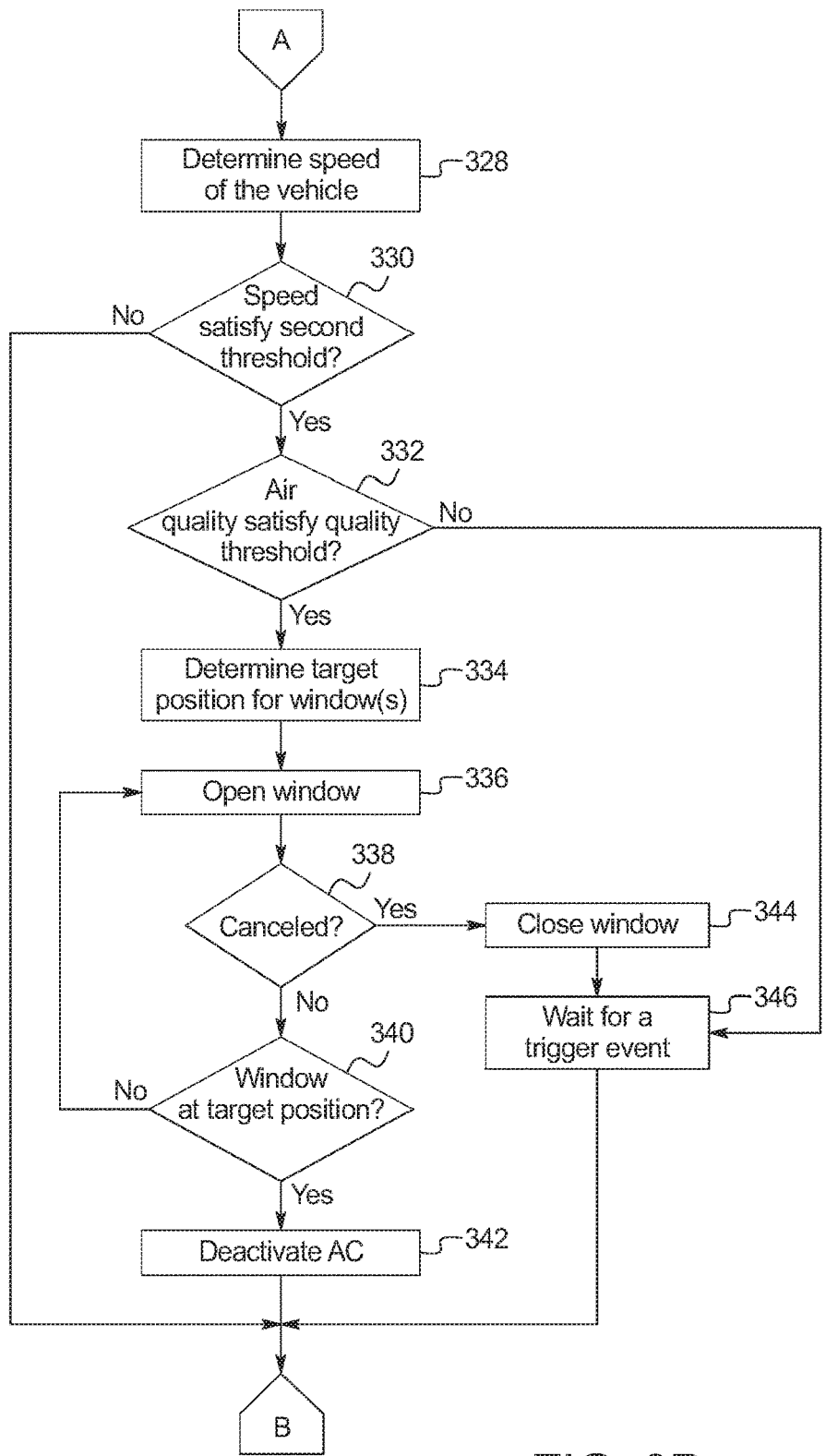

FIGS. 3A and 3B are flowcharts of a method to control the side windows 114 based on the speed of the vehicle 100 of FIG. 1 that may be implemented by the electronic components 200 of FIG. 2. Initially, at block 302 (FIG. 3A), the body control module 102 determines whether the air conditioner of the HVAC system 104 is active. If the air conditioner of the HVAC system 104 is active, the method continues at block 328 (FIG. 3B). Otherwise, if the air conditioner of the HVAC system 104 is not active, the method continues at block 304. At block 304, the body control module 102 determines whether one or more of the side windows 114 are open. If one or more of the side windows 114 are open, the method continues at block 306. Otherwise, if the side windows 114 are closed, the method returns to block 302.

At block 306, the body control module 102 determines, via the speed sensor 108, the speed of the vehicle 100. At block 308, the body control module 102 determines whether the speed of the vehicle 100 satisfies (e.g., is greater than or equal to) a first speed threshold. In some examples, the first speed threshold is between 45 mph and 50 mph. If the speed of the vehicle 100 satisfies the first speed threshold, the method continues at block 310. Otherwise, if the speed of the vehicle 100 does not satisfy the first speed threshold, the method returns to block 304. At block 310, the body control module 102 initiates (e.g., sets to zero) a counter. The counter tracks attempts to close the side windows 114. At block 312, the body control module 102, via the window controller(s) 106 associated with the open side window(s) 114, attempts to close the side windows 114. At block 314, the body control module 102, determines whether the window controller(s) 106 associated with the open side window(s) 114 detect an obstruction. If the window controller(s) 106 associated with the open side window(s) 114 detect an obstruction, the method continues at block 316. Otherwise, if the window controller(s) 106 associated with the open side window(s) 114 do not detect an obstruction, the method continues at block 323.

At block 316, the body control module 102 increments the counter initiated at block 310. At block 318, the body control module 102 determines whether the counter satisfies (e.g., is greater than or equal to) an attempt threshold. In some examples, the attempt threshold is three. If the counter satisfies the attempt threshold, the method continues at block 320. Otherwise, if the counter does not satisfy the attempt threshold, the method returns to block 312. At block 320, the body control module 102 activates an alert (e.g., a buzzer, a chime, a notification on the dashboard display, etc.) to notify the occupants of the vehicle 100 that the side windows 114 could not be closed. At block 322, the body control module 102 waits a period of time. In some examples, the period of time is between five and ten minutes.

At block 323, the body control module 102 closes the side window(s). At block 324, the body control module 102 determines a temperature setting and a blower setting for the HVAC system 104. In some examples, the temperature setting and the blower setting are stored in memory (e.g., the memory 210 of FIG. 2). Alternatively, in some examples, the body control module 102 includes default settings for the temperature setting and the blower setting based on, for example, average user settings. Alternatively, the body control module 102 may include a table that associated the current ambient temperature and the current cabin temperature. At block 326, the body control module 102 instructs the HVAC system 104 to activate the air conditioner with the temperature setting and the blower speed setting determined at block 324.

At block 328 (FIG. 3B), the body control module 102 determines, via the speed sensor 108, the speed of the vehicle 100. At block 330, the body control module 102 determines whether the speed of the vehicle 100 satisfies (e.g., is less than or equal to) a second speed threshold hold for a threshold period of time. In some examples, the second speed threshold is 30 mph. Additionally, in some examples, the threshold period of time is 30 seconds. If the speed of the vehicle 100 satisfies the second speed threshold for the threshold period of time, the method continues to block 332. Otherwise, if the speed of the vehicle 100 does not satisfy the second speed threshold for the threshold period of time, the method returns to block 302 (FIG. 3A), At block 332, the body control module 102 determines whether the air quality satisfies (e.g., is less than or equal to) an air quality threshold. In some examples, the body control module 102 connects, via the on-board communications platform 206, to the air quality server 118 and receives an AQI value. In some examples, the air quality threshold is 100 AQI. If the air quality value satisfies the air quality threshold, the method continues to block 334. Otherwise, if the air quality value does not satisfy the air quality threshold, the method continues to block 346. At block 334, the body control module 102 determines a target position for one or more of the side windows 114. In some examples, the previous positions of the side windows 114 are stored in the memory 210. Alternatively, in some examples, the target position for one or more of the side windows 114 is determined based on the ambient temperature and/or the cabin temperature. For example, the body control module 102 may determine a more open target position when the cabin temperature is cooler.

At block 336, the body control module 102 opens the one or more side windows 114 via the window controllers 106. At block 338, body control module 102 determines whether it has received a signal from an occupant of the vehicle 100 to cancel opening the side windows 114. For examples, the body control module 102 may determines that opening the side windows 114 is to be cancelled the driver presses the one of the window control buttons on the door. If the signal to cancel has been received, the method continues to block 344. If the signal to cancel has not been received, the method continues to block 340. At block 340, the body control module 102 determines whether the side windows 114 are at their target position determines at block 334. If the side windows 114 are that their target position, the method continues to block 342. Otherwise, if the side windows 114 not are that their target position, the method returns to block 336. At block 342, the body control module 102 instructs the HVAC system 104 to deactivate the air conditioning. The method then returns to block 302 (FIG. 3A). At block 344, the body control module 102 closes the side windows 114. At block 346, the body control module 102 waits for a trigger event. For example, the trigger event may be the speed to the vehicle reaching zero, the transition being shifted into park, and/or the ignition switch toggling from an off position to an on position. The method then returns to block 302 (FIG. 3A).

The flowcharts of FIGS. 3A and 3B are representative of machine readable instructions that comprise one or more programs that, when executed by a processor (such as the processor 208 of FIG. 2), cause the vehicle 100 to implement the example body control module 102 of FIGS. 1 and 2. Further, although the example program(s) is/are described with reference to the flowchart illustrated in FIGS. 3A and 3B, many other methods of implementing the example body control module 102 may alternatively be used. For example, the order of execution of the blocks may be changed, and/or some of the blocks described may be changed, eliminated, or combined.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". The terms "includes," "including," and "include" are inclusive and have the same scope as "comprises," "comprising," and "comprise" respectively.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

What is claimed is:

1. A vehicle comprising:
   a speed sensor; and
   a body control module;
   wherein, when a side window is open, the body control module is to:
      monitor, via the speed sensor, a speed of the vehicle; and
      in response to the speed of the vehicle satisfying a first speed threshold:
         store, in memory, an initial position of the side window to enable restoring the side window to the initial position;
         close the side window; and
         activate an air conditioner; and
   wherein, when the side window is closed and the air conditioner of an HVAC system is active, the body control module is to:
      monitor, via the speed sensor, the speed of the vehicle;
      receive an air quality indicator from an external server; and
      in response to (a) the speed of the vehicle satisfying a second speed threshold and (b) the air quality indicator satisfying an air quality threshold:
         open the side window to the initial position stored in memory; and
         deactivate the air conditioner of the HVAC system.

2. The vehicle of claim 1, wherein the body control module is to, when activating the air conditioner of an HVAC system, determine a temperature setting and a blower speed setting for the air conditioner.

3. The vehicle of claim 2, wherein preferences of a user for the temperature setting and the blower speed setting are stored in memory.

4. The vehicle of claim 2, wherein the temperature setting and the blower speed setting are based on a cabin temperature and an ambient temperature.

5. The vehicle of claim 1, wherein the body control module is to, when closing the side window:
   initiate a counter;
   when an obstruction is detected in a path of the side window, increment the counter; and
   in response to the counter satisfying an attempt threshold, stop closing the side window.

6. The vehicle of claim 1, wherein the body control module is to, when the side window is closed and the air conditioner of the HVAC system is active:
   monitor, via the speed sensor, a speed of the vehicle;
   in response to the speed of the vehicle satisfying a second speed threshold, open the side window to the initial position stored in memory and then deactivate the air conditioner of the HVAC system.

7. The vehicle of claim 6, wherein the body control module is to, before deactivating the air conditioner of the HVAC system, store a temperature setting and a blower setting in memory.

8. A method comprising:
   monitoring, with a speed sensor, a speed of a vehicle;
   monitoring an air quality indicator received from an external server;
   in response to the speed of the vehicle satisfying a first speed threshold when one of a plurality of side windows is open:
      storing, in memory, initial position settings of the plurality of side windows to facilitate restoring the positions of the plurality of side windows to the initial position settings;
      closing, with window controllers, the plurality of side windows; and
      after the plurality of side windows are closed, activating, with a processor, an air conditioner; and
   in response to (a) the speed of the vehicle satisfying a second speed threshold and (b) the air quality indicator satisfying an air quality threshold when all of the plurality of side windows are closed and the air conditioner of an HVAC system is active:
      opening at least one of the plurality of side windows to a corresponding one of the initial position settings; and
      deactivating the air conditioner of the HVAC system.

9. The method of claim 8, including, when activating the air conditioner of an HVAC system, determining a temperature setting and a blower speed setting for the air conditioner.

10. The method of claim 9, wherein preferences of a user for the temperature setting and the blower speed setting are stored in memory.

11. The method of claim 9, wherein the temperature setting and the blower speed setting are based on a cabin temperature and an ambient temperature.

12. The method of claim 8, including, when closing the plurality of side windows:
  initiating a counter;
  when an obstruction is detected in a path of one of the plurality of side windows, incrementing the counter; and
  in response to the counter satisfying an attempt threshold, returning the plurality of side windows to their original position settings.

13. The method of claim 8, including, when all of the plurality of side windows are closed and the air conditioner of an HVAC system is active:
  monitoring, via the speed sensor, a speed of the vehicle;
  in response to the speed of the vehicle satisfying a second speed threshold:
    opening at least one of the plurality of side windows to a corresponding one of the initial position settings; and
    deactivating the air conditioner of the HVAC system.

14. The method of claim 13, including, before deactivating the air conditioner of the HVAC system, storing a temperature setting and a blower setting in memory.

15. A vehicle comprising:
  a speed sensor; and
  a body control module that, when a window is closed and an air conditioner is active, is to:
    monitor, via the speed sensor, a vehicle speed;
    receive an air quality indicator from an external server; and
    responsive to the vehicle speed satisfying a speed threshold and the air quality indicator satisfying an air quality threshold:
    open the window to a stored initial position; and
    deactivate the air conditioner.

* * * * *